United States Patent [19]
Harm et al.

[11] Patent Number: 6,007,420
[45] Date of Patent: Dec. 28, 1999

[54] OPERATING ELEMENT IN A MOTOR VEHICLE

[75] Inventors: Klaus Harm; Thomas Schwarz, both of Stuttgart, Germany

[73] Assignee: DaimlerChrysler AG, Stuttgart, Germany

[21] Appl. No.: 09/135,481

[22] Filed: Aug. 18, 1998

[30] Foreign Application Priority Data

Aug. 18, 1997 [DE] Germany ............... 197 35 834

[51] Int. Cl.⁶ ..................................... B60H 1/00
[52] U.S. Cl. ................................ 454/140; 454/152
[58] Field of Search ............... 454/140, 139, 454/143, 152, 156, 69

[56] References Cited

U.S. PATENT DOCUMENTS

| | | |
|---|---|---|
| 4,562,957 | 1/1986 | Nakagawa et al. . |
| 4,640,340 | 2/1987 | Noda et al. . |
| 4,679,730 | 7/1987 | Uchida . |

FOREIGN PATENT DOCUMENTS

| | | |
|---|---|---|
| 2682071A1 | 4/1993 | France . |
| 2322484 | 5/1973 | Germany . |
| 2164976 | 7/1973 | Germany . |
| 2923204A1 | 12/1980 | Germany . |
| 3713450A1 | 11/1988 | Germany . |

*Primary Examiner*—Harold Joyce
*Assistant Examiner*—Derek S. Boles
*Attorney, Agent, or Firm*—Evenson McKeown Edwards & Lenahan, PLLC

[57] ABSTRACT

An operating element in a motor vehicle having a hollow gripping section which can be gripped by an occupant, is arranged above the leg space of the motor vehicle and is provided in a ventilatable manner with air outlet openings to which air is guided through an air guiding duct which flows through air outlet openings into the occupant compartment. The air guiding duct starts in the leg space of the occupant compartment, and, from the gripping section heated by the effect of the sun, warmer air can flow off through the air outlet openings into the occupant compartment. By way of the air guiding duct, cooler air from the leg space is taken into the gripping suction.

18 Claims, 2 Drawing Sheets

OPERATING ELEMENT IN A MOTOR VEHICLE

BACKGROUND AND SUMMARY OF THE INVENTION

This application claims the priority of German application 197 35 834.9-21, filed in Germany on Aug. 18, 1997, the disclosure of which is expressly incorporated by reference herein.

The invention relates to an operating element in a motor vehicle having a hollow gripping section which can be gripped by an occupant, which is arranged above a leg space of the motor vehicle and is provided with air outlet openings in a ventilatable manner, to which air outlet openings air is guided through an air guiding duct which flows out into an occupant compartment through the air outlet openings.

From German Patent Document DE 21 64 976 A1, an operating element is known in the form of a steering wheel for a motor vehicle, whose gripping section on the steering wheel rim is supplied by way of connecting and feeding tubes, which are connected with the warm air and cooling air sources existing in the vehicle, with warm and cold air which can emerge by way of the steering wheel spokes and the steering wheel rim. In this case, for cooling or warming the driver's hands, corresponding air is actively supplied to the steering wheel rim.

In German Patent Document DE 37 13 450 A1, an arrangement is described for tempering steering and switching devices where the heating and cooling energy is supplied in the form of gas, liquid and/or electric energy, for which feeding and removal lines to a steering column are provided in a closed circuit or for an external energy supply.

Also according to an embodiment of a steering wheel in German Patent Document DE 23 22 484 A1, an active air feeding is provided to a steering wheel hub by means of which the fresh air or the heating air is blown against the driver from the baffle plate.

In U.S. Pat. No. 4,640,340 A1, a steering wheel with a heat exchanger is described from which a heated or cooled liquid can be transported into the central tube of the steering wheel rim.

In the embodiment of a steering wheel described in French Patent Document FR 26 82 071 A1, the Peltier effect is used for the cooling or the heating of a steering wheel.

Concerning the general background of the external ventilating of steering wheels, reference is also made to U.S. Pat. No. 4,562,957 A1 and U.S. Pat. No. 4,679,730.

An object of the invention consists of reducing the energy consumption for ventilating the gripping section of an operating element of a motor vehicle.

This object is achieved according to preferred embodiments of the invention by providing an arrangement wherein the air guiding duct starts in a leg space of the occupant compartment, and wherein, from a gripping section heated by the effect of the sun, warmer air can flow off through the air outlet openings into the occupant compartment, and, in the process, by way of the air guiding duct, cooler air is taken from the leg space into the gripping section.

Under the effect of the sun, operating elements in a motor vehicle may heat up considerably so that they can hardly be touched in their gripping section without pain.

In sun-irradiated vehicles, the sun radiation in the occupant compartment results in a temperature increase of approximately +20° C. starting from the leg space (30° C.) to the level of the steering wheel.

Because of the operating element which, as the result of the radiation of the sun is often heated by another 30° C. and more, by means of the air guiding according to the invention, the air can emerge from the operating element because of its lower density through the outlet openings into the occupant compartment and in the process—because of the resulting vacuum—sucks up the cooler air through the air guiding duct from the leg space of the occupant compartment. The gripping section of the operating element is cooled because of this passive ventilation.

Particularly for the gripping section of a steering wheel on the steering wheel rim, this passive ventilation has a very positive effect because the uniform tempering of the steering wheel rim surface ensures a secure and pleasant grip around the steering wheel rim in the driving operation.

This effect is particularly noticeable when the vehicle is parked and heated by the sun, where, in a passive manner, relatively cool air is pulled from the floor area into the steering wheel without requiring electric current or a running fan for this purpose. By means of a thermal insulation of the air guiding duct, the cool air from the leg space does not unnecessarily heat up on its way.

Also when a fan is used for the air transport, advantages are achieved in connection with the passive ventilating because the energy required for the fan will be lower.

In certain preferred embodiments, spaced knit under the air-permeable cover of the operating element also has an air-permeable construction and separates the cover with the contact surface thermally from the metallic, considerably heating-up, interior frame of the operating element. Because of the spaced knit, the cover stores little heat or coldness and is adapted more rapidly to the palm temperature of the gripping person.

In certain preferred embodiments, because of the construction of an intermediate layer as a knit, for example, woven from threads, the cover receives from it a high uniform air supply as the result of which the flow-out on the cover is hardly noticeable. In addition, a soft, elastic gripping sensation can be achieved.

For heating up the gripping section of the operating element additionally for the winter, a heating wire can be worked into the spaced knit which, directed against the cover, ensures a rapid heat-up rate while the electric energy consumption is low.

Other objects, advantages and novel features of the present invention will become apparent from the following detailed description of the invention when considered in conjunction with the accompanying drawings.

DETAILED DESCRIPTION OF THE DRAWINGS

Figure 1:
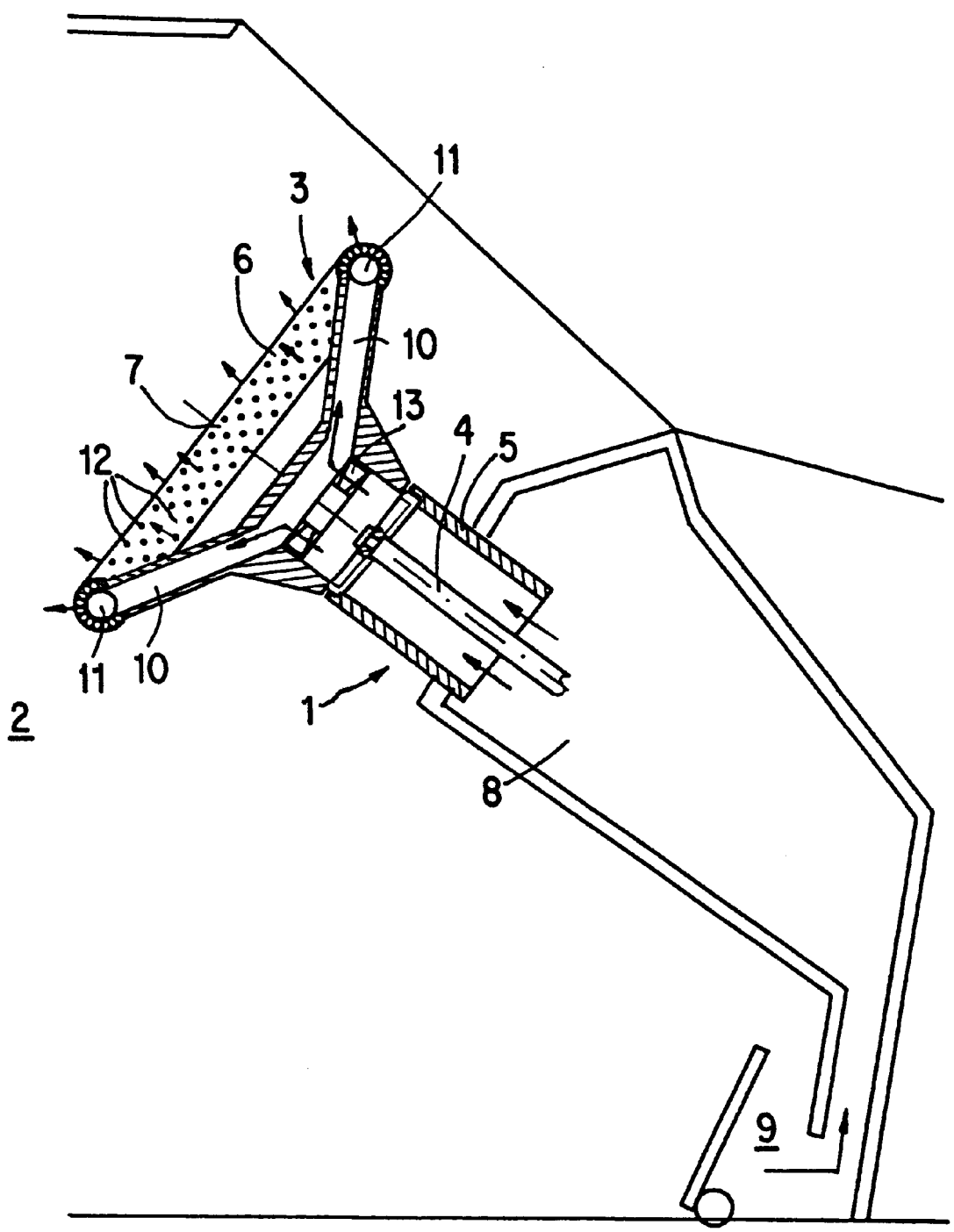
FIG. 1 is a sectional lateral view of a steering column in a motor vehicle having an air guiding duct which can guide air from the leg space to the steering wheel, constructed according to a preferred embodiment of the present invention.

FIG. 1 illustrates a steering column 1 in an occupant compartment 2, which is not shown in detail, of a motor vehicle. The steering column 1 comprises a steering wheel 3 on a steering spindle 4 which in the upper section is surrounded by a steering spindle covering 5.

The steering wheel 3 is used as an operating element for the driver of the motor vehicle in order to act upon the steering gear and the wheels by way of the rotation of the steering spindle and steer the motor vehicle. For this purpose, the driver should grip by means of both hands around a steering wheel rim 6 of the steering wheel 3 during the drive on the right and the left side in opposite gripping sections 7.

It presents a problem that, under a strong sun radiation, mainly when the vehicle is standing, the steering wheel rim 6 may heat up considerably, as a result of which the touching of the corresponding gripping sections 7 becomes difficult. For this reason, the steering column 1 has a passive air guidance according to the arrows through an air guiding duct 8 which takes in air in the leg space 9 of the occupant compartment 2 and guides it through the steering spindle covering 5 and though hollow struts 10 of the steering wheel into a hollow interior ring 11 of the steering wheel rim 6, after which it returns into the occupant compartment through the air outlet openings 12.

In this case, the air outlet openings 12 are designed such that the air heating up under the radiation of the sun in the steering wheel rim 6 can flow because of its density by itself through the air outlet openings 12 into the occupant compartment 2. In this case, because of the then resulting vacuum in the steering wheel rim 6, cooler air is taken in through the air guiding duct 8 from the leg space 9 of the occupant compartment 2 and the steering wheel rim 6 is cooled so that it can be comfortably gripped again. This cooling operation of the steering wheel 3 functions also without the use of energy when the vehicle is standing. Also if, additionally, for an effective air transport, a fan 13 is arranged in the steering wheel 3, by means of the passive air guidance according to the invention, a clear saving of energy is achieved. It is helpful in this case for the air guiding duct 8 to be thermally insulated for guiding the cooler air from the leg space 9 to the outside.

By means of this passive air guidance of cooler air from the leg space 9 into the heated operating element (steering wheel) 3, a high thermal comfort is achieved on the gripping sections 7 at low technical expenditures, whereby the driving safety is also increased because of a pleasant steering wheel temperature with a uniform tempering which can hardly be noticed as an air flow.

Figure 2:
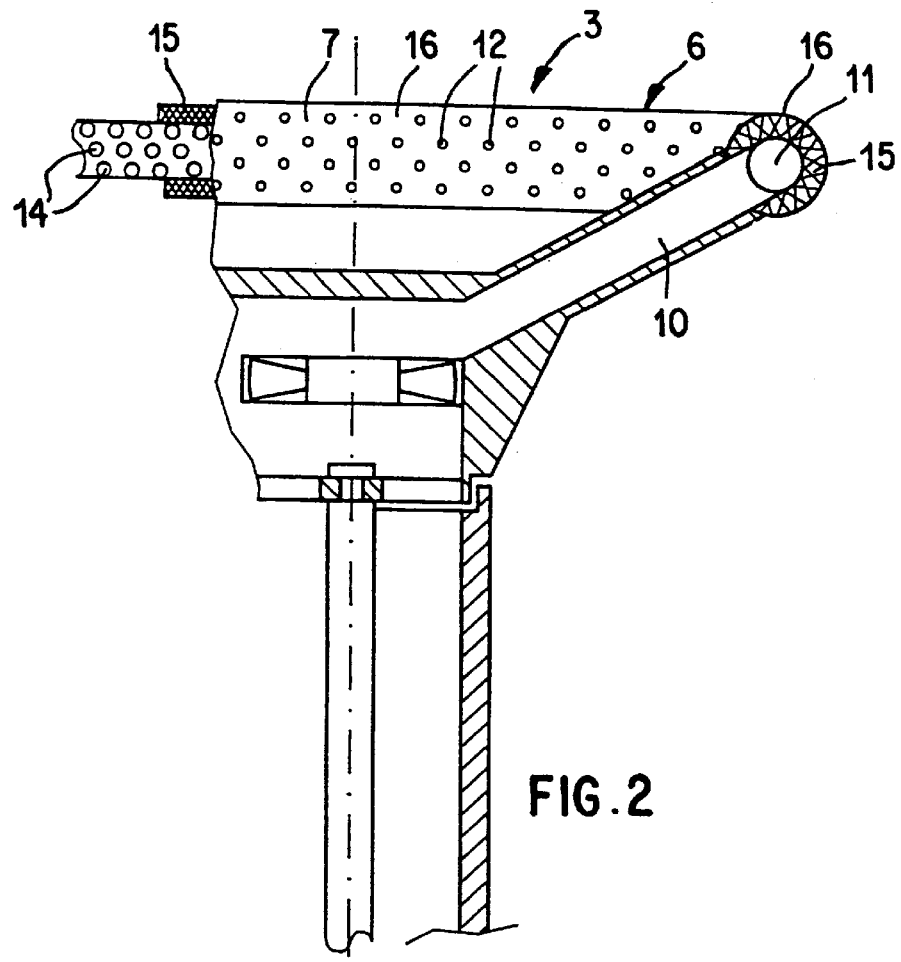
FIG. 2 is an enlarged sectional representation of the construction of the steering wheel of FIG. 1.

As illustrated more clearly in FIG. 2, the steering wheel 3 is constructed with hollow struts 10 through which the taken-in air arrives in the hollow interior ring 11 of the steering wheel rim 6. The interior ring 11 has numerous passage bores 14 and is surrounded by a spaced knit 15 which is surrounded toward the outside by a perforated cover 16 which forms the gripping sections 7 of the steering wheel rim 6 for the driver and has numerous air outlet openings 12 through which the air can flow into the occupant compartment 2.

Figure 3:
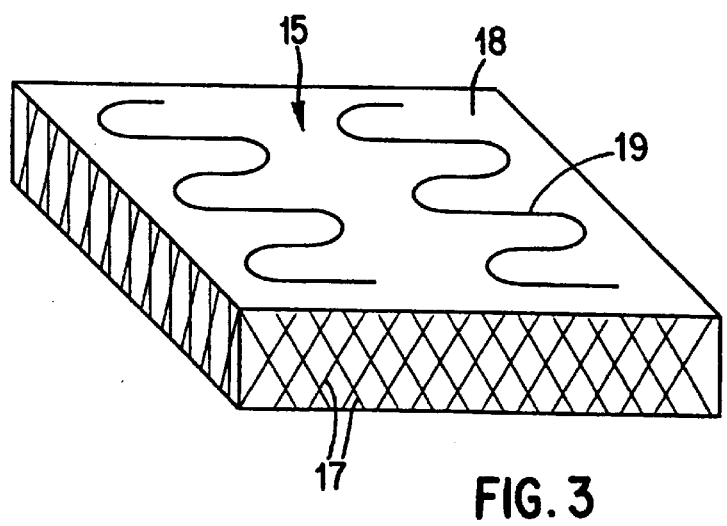
FIG. 3 is a view of an example of the construction of the spaced knit for the steering wheel of FIGS. 1 and 2.

In an embodiment according to FIG. 3, the air-permeable spaced knit 15 is made of elastic threads 17 which cross one another in a diamond-shaped manner in their cross-section, and an electric heating wire 19 for a heating in the winter is worked into the surface 18 of the spaced knit 15 which is directed against the cover 16.

By means of the spaced knit 15, a soft elastic gripping sensation is obtained. Furthermore, a good ventilating, that is also a good cooling of the steering wheel rim 6 is ensured whose considerably heating-up, metallic interior ring 11 is largely thermally uncoupled from the cover 16. Despite the low weight of the spaced knit 15, it is nevertheless resistant to torsion and, in addition, can be connected with the interior ring 11 in a non-rotatable manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating element in a motor vehicle, having a hollow gripping section which can be gripped by an occupant, is arranged above a leg space of the motor vehicle and is provided with air outlet openings in a ventilatable manner, to which air outlet openings air is guided through an air guiding duct which flows out into an occupant compartment through the air outlet openings, wherein the air guiding duct starts in a leg space of the occupant compartment, and wherein, from a gripping section heated by the effect of the sun, warmer air can flow off through the air outlet openings into the occupant compartment, and, in the process, by way of the air guiding duct, cooler air is taken from the leg space into the gripping section.

2. Operating element according to claim 1, wherein a steering column comprises the air guiding duct starting in the leg space of the occupant compartment and extends into a steering wheel which has air outlet openings leading into the occupant compartment.

3. Operating element according to claim 1, wherein the operating element has an air-permeable cover on its surface, and wherein an air-permeable spacing knit is inserted into the cover.

4. Operating element according to claim 3, wherein the spaced knit is made of elastic threads which cross one another in a diamond shape in their cross-section.

5. Operating element according to claim 3, wherein an electric heating wire is worked into the surface of the spaced knit directed against the cover.

6. Operating element according to claim 1, wherein the air guiding duct is thermally insulated toward the outside.

7. Operating element according to claim 1, wherein the air guiding duct has a connection to the air conditioner or heater of the motor vehicle.

8. Operating element according to claim 2, wherein a fan is arranged in the steering wheel.

9. A passenger vehicle assembly comprising:

a vehicle occupant space including a leg space, an occupant operable operating element disposed in the occupant space above the leg space, said operating element including at least one gripping section which in use is manually gripped by a vehicle occupant, and an air guiding duct which opens to said leg space and connects with the operating element, wherein said air guiding duct and operating element are configured to provide a flow of cooling air from the leg space to the operating element in response to heating of the operating element.

10. An assembly according to claim 9, wherein said operating element is a vehicle steering wheel which includes air outlet openings to said occupant space, said air outlet openings being fluidly connected with the air guiding duct such that said flow of cooling air from the leg space flows through said air outlet openings into the occupant space to thereby cool gripping surfaces of the steering wheel.

11. An assembly according to claim 10, wherein said air guiding duct extends along a steering column supporting the steering wheel.

12. An assembly according to claim 10, wherein said steering wheel includes an annular hollow rim connected by hollow spokes leading to said air guiding duct.

13. An assembly according to claim 12, comprising an air permeable knit interposed between the rim and the gripping surfaces.

14. An assembly according to claim 13, comprising a gripping cover with the gripping surfaces surrounding the knit, said gripping cover including air openings to the occupant space.

15. An assembly according to claim 14, wherein the rim is made of metal and includes air openings to the knit.

16. An assembly according to claim 15, wherein the knit is made of elastic threads which cross one another.

17. An assembly according to claim 16, wherein an electric heating wire is worked into the surface of the spaced knit directed against the cover.

18. An assembly according to claim 10, wherein the air guiding duct has a connection to the air conditioner or heater of the motor vehicle.

* * * * *